United States Patent Office 3,367,942
Patented Feb. 6, 1968

3,367,942
CYCLIC AMIDE PLASTICIZERS FOR
POLYVINYL ALCOHOL
Richard A. Hickner, Midland, Mich., assignor to The Dow
Chemical Company, Midland, Mich., a corporation of
Delaware
No Drawing. Filed Oct. 9, 1963, Ser. No. 314,852
4 Claims. (Cl. 260—30.2)

This invention concerns polyvinyl alcohol compositions plasticized or made flexible with certain cyclic amides.

Moldings, extruded tubes, and sheets of plasticized polyvinyl alcohol (hereafter PVA) are often used where resistance to organic solvents is required and attack by water is unlikely. Diols such as ethylene glycol or 1,4-butanediol are often used as plasticizers for PVA, but they have the disadvantage of having a very high volatility. Thin films of PVA plasticized with ethylene glycol stiffen up fairly rapidly due to loss of plasticizer.

It has now been discovered that certain cyclic amides combined plasticizing efficiency for PVA with low volatility.

The plasticizers used in this invention have the general formula

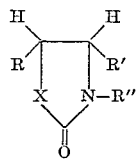

wherein R and R' individually are one of H and lower alkyl groups containing up to 4 carbon atoms, R" is one of H, hydroxyalkyl groups containing up to 4 carbon atoms, $-(CH_2)_nOCOR'''$ and $-(CH_2)_nCOOR'''$, R''' is a lower alkyl group containing up to 4 carbon atoms, $n$ is an integer from 2 to 4 and X is one of O and NH. Such compounds include 2-oxazolidinone, 2-imidazolidinone, their ring substituted lower alkyl derivatives, their N-hydroxyalkyl derivatives and the like. Preferred plasticizers are lower alkyl substituted 2-oxazolidinones such as 5-methyl-2-oxazolidinone and hydroxyalkyl oxazolidinones such as 3-(2-hydroxyethyl)-5-methyl-2-oxazolidinone.

The resinous polymeric vinyl alcohols used in the practice of this invention are prepared by alcoholysis, sometimes referred to as hydrolysis, of polyvinyl acetate to varying degrees between 50 percent and up to 100 percent. All are soluble in water. The first code number following the trade name of commercial PVA's indicates the degree of hydrolysis, while the second set of numbers indicates the approximate viscosity in centipoises, hereafter cps., of a 4 percent aqueous solution at 20° C.

Flexible articles of various forms may be made, as is known, by molding, extruding, dipping and other procedures, from plasticized compositions of PVA. Such compositions may also contain filling, coloring and other modifying ingredients, if desired. The term "polyvinyl alcohol," sometimes PVA, is used herein to designate generically not only pure PVA, which may be obtained in various modifications, but also such partial derivatives thereof as contain a sufficient number of unsubstituted hydroxyl groups as to render the compound soluble in water. For a fuller definition of the term "polyvinyl alcohol," see U.S. Patent No. 2,111,272, issued Mar. 15, 1938.

According to the present invention, PVA is mixed with water and a cyclic amide plasticizer, as described above, and, if desired, also with a water-soluble alkanol, a thermal stabilizer for the PVA such as a metal salt and other ingredients, e.g., pigments, dyes, odorants, etc., to provide a composition containing from about 50 to about 90 weight percent PVA and from about 50 to 10 weight percent cyclic amide, PVA basis. The metal salt, if desired, is dissolved in the water and added to the other ingredients in the solution. After mixing, the resulting composition is passed through rolls to form the material in strips. The temperature of the rolls may be varied within wide limits, e.g., 15°–90° C., depending upon the water content, the nature of the PVA, the thickness of the strips and the ingredients of the mixture. The strips may then be converted by extrusion or molding procedures into any indicated form. Other methods, e.g., casting films from solutions, may also be used.

The following examples describe completely representative specific embodiments and the best mode contemplated by the inventor of carrying out the invention. The examples are not to be taken as limitative of the invention other than as defined in the claims.

Example 1

A stock solution was prepared from 10 g. of Elvanol 52-22 polyvinyl alcohol (Du Pont), 50 ml. of water and 50 ml. of ethanol. To 10 ml. of stock solution 0.3 g. of a plasticizer, as indicated below, was added and a film was cast on a glass plate using a doctor blade. After the solvent had evaporated, the film was removed with a razor blade. All of the films were clear. The other properties are described below, following the plasticizer used.

ethylene glycol: fairly brittle film; lost considerable flexibility on standing
5-methyl-2-oxazolidinone: very flexible film; retained flexibility on prolonged standing
3-(2-hydroxyethyl)-5-methyl-2-oxazolidinone: very flexible, tough and elastic; film clings to objects; on prolonged standing some flexibility was lost, but still superior to glycerol
propionate ester of 3 - (2 - hydroxyethyl)-5-methyl-2-oxazolidinone: properties similar to last preceding film
glycerol: flexible, elastic film; gradually lost flexibility on prolonged standing; similar to 5-methyl-2-oxazolidinone.

Example 2

A quantity of 20 g. of Elvanol 70–05 PVA (Du Pont) was dissolved in 200 ml. of water. To each 10 ml. of solution was added 0.25 g. of plasticizer (25 percent plasticizer). Samples were prepared using as plasticizers 3-(2-hydroxyethyl)-5-methyl-2-oxazolidinone, 3 - (2-hydroxypropyl)-5-methyl-2-oxazolidinone and 1-(2-hydroxypropyl)-4-methyl-2-imidazolidinone. Films were cast as above. Each plasticizer gave a clear, continuous film which retained its flexibility on prolonged standing.

What is claimed is:
1. Polyvinyl alcohol plasticized with a compound of the formula

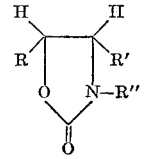

wherein R and R' individually are H or a lower alkyl group containing up to 4 carbon atoms and R" is H or a hydroxyalkyl group containing up to 4 carbon atoms.
2. Polyvinyl alcohol plasticized with 5-methyl-2-oxazolidinone.
3. Polyvinyl alcohol plasticized with 3-(2-hydroxyethyl)-5-methyl-2-oxazolidinone.

4. Polyvinyl alcohol plasticized with 3-(2-hydroxypropyl)-5-methyl-2-oxazolidinone.

References Cited

UNITED STATES PATENTS 3,248,399   4/1966   Walles et al. _____ 260—309.5

OTHER REFERENCES

Buttrey: Plasticizers, Franklin Publishing Co., 1960, pp. 14–15.

Doolittle: The Technology of Solvents and Plasticizers, John Wiley & Sons, 1954, pp. 959 and 961.

Simonds et al.: Handbook of Plastics, D. Van Nostrand Co., 2nd ed., 1949, pp. 718–719, 724–725.

JULIUS FROME, *Primary Examiner*.

MORRIS LIEBMAN, *Examiner*.

L. T. JACOBS, *Assistant Examiner*.